United States Patent Office 3,426,533
Patented Feb. 11, 1969

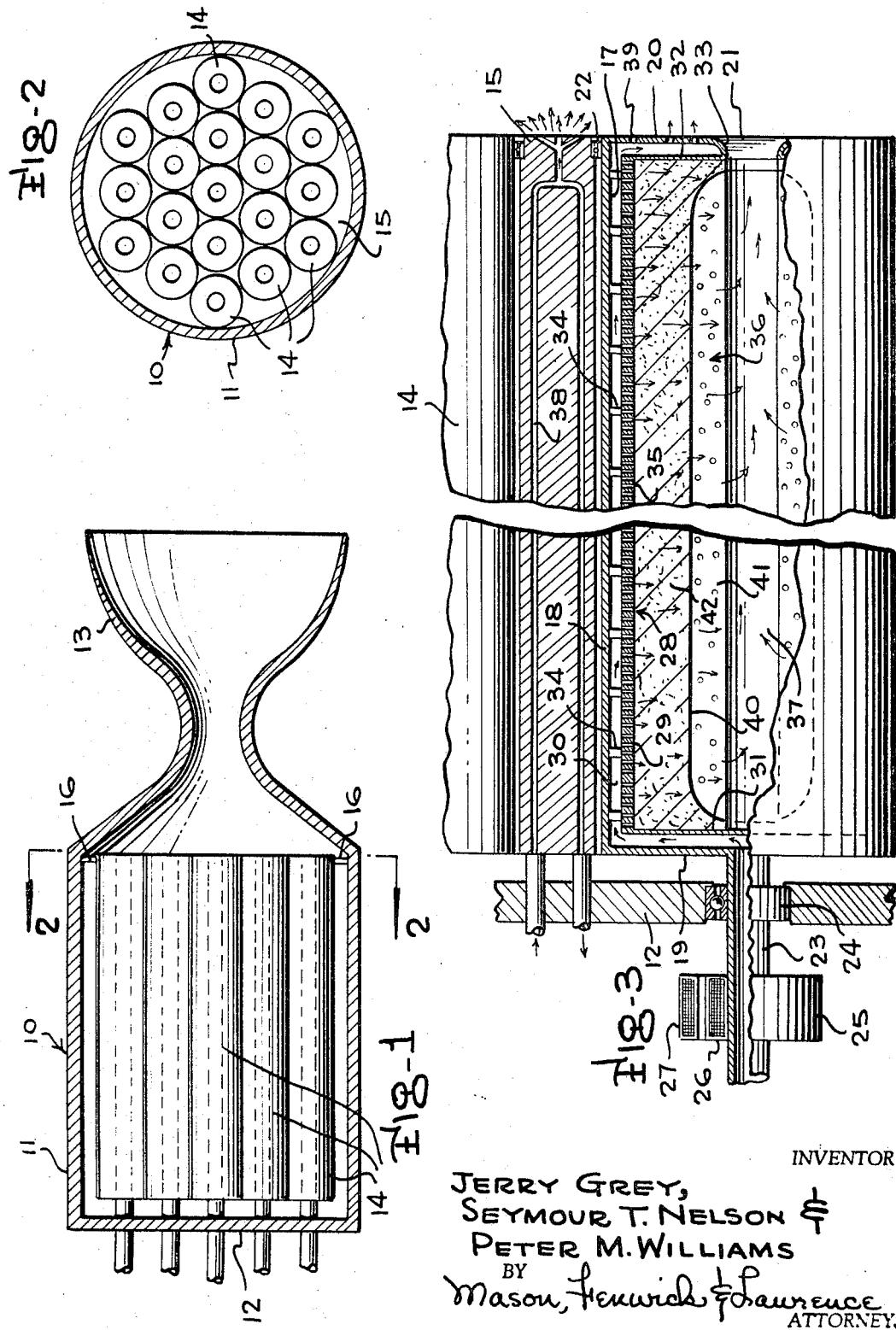

3,426,533
LIQUID CORE NUCLEAR PROPULSION REACTOR
Jerry Grey, 61 Adams Drive, Princeton, N.J. 08540;
Seymour T. Nelson, Lake Hiawatha, N.J.; and Peter
M. Williams, Princeton, N.J. (9418 Thrush Lane, Potomac, Md. 20854); said Nelson assignor to said Grey
Filed June 28, 1965, Ser. No. 474,200
U.S. Cl. 60—203   30 Claims
Int. Cl. G21d 5/06

This invention relates to a nuclear reaction propulsion unit and more particularly to a liquid core nuclear propulsion reactor.

In the liquid core concept as applied to nuclear propulsion reactors, the fissionable fuel material is contained in the molten state within a single hollow cylinder. The molten fissionable material is contained within the cylinder by the centrifugal force developed through rotation of the cylinder about its axis. The working fluid or propellant gas is injected from the exterior through radial passages in the cylinder and is caused to traverse through the molten mass of fissionable fuel material. As the propellant gas traverses through the fissionable material inwardly toward the center of the cylinder, it is heated by the fission energy generated within the fuel material. Upon reaching the hollow central cavity of the cylinder, the propellant gas is exhausted axially through an opening in one end of the cylinder to a conventional nozzle located in the open end of the cylinder, producing thrust.

The conventional single cylinder reactor configuration has been found to have certain performance limitations. It particularly has been found in conventional single cylinder reactors that the loss of fissionable fuel material through vaporization, limits the specific impulse to about 1,200 seconds. In addition, the single cylinder reactor, as described above, can develop estimated thrust/weight ratios ranging from only $8 \times 10^{-3}$ for a 1.5 ft. diameter core to a $9 \times 10^{-2}$ for a 6 ft. diameter cord, with required critical masses or uranium 235 ranging between 690 to 10,800 kilograms, respectively.

Accordingly, it is the principal object of this invention to provide an improved nuclear reactor propulsion unit.

Another object of this invention is to provide an improved nuclear reactor propellant unit of the type having a liquid core reactor.

A further object of this invention is to provide a novel nuclear propulson unit having a liquid core reactor which can heat propulsion gases considerably higher than those attainable in conventional nuclear propulsion reactors.

A still further object of this invention is to provide a novel liquid core nuclear propulsion reactor which is considerably lighter in weight than other conventional liquid core nuclear propulsion reactors, and has a specific impulse up to seconds and high propellant pressures, providing relatively high thrust/weight ratios.

Another object of the present invention is to provide an improved liquid core nuclear propulsion reactor having an increased flow area, thereby considerably increasing the total propellant flow rate and, correspondingly, the thrust of the device.

A further object of this invention is to provide a novel liquid core nuclear propulsion reactor providing a highly efficient thermal neutron spectrum and having a critical mass of fissionable material at least several orders of magnitude smaller than that of conventional liquid core nuclear propulsion reactors.

A still further object of this invention is to provide a novel liquid core nuclear propulsion reactor, in which the high temperature regions are restricted to components thereof having no structural function.

Another object of this invention is to provide an improved liquid core nuclear propulsion reactor having reduced structural load with respect to the fuel elements, thereby permitting the use of uniform mixtures in the fuel elements.

A further object of this invention is to provide a novel liquid core nuclear propulsion reactor having substantially zero net angular momentum of both the structure and the exhaust gases.

Other objects and advantages of the present invention will become more apparent to those persons skilled in the art, from the following description when taken in conjunction with the accompanying drawings, wherein:

FIGURE 1 is a vertical sectional view of an embodiment of the invention;

FIGURE 2 is a cross-sectional view taken along line 2—2 in FIGURE 1; and

FIGURE 3 is an enlarged side elevational view of a fuel element illustrated in FIGURE 1, having portions thereof broken away.

In accordance with the broad aspects of the present invention there is provided a nuclear reactor propulsion unit generally comprising a plurality of fuel elements in which the interiors thereof define thrust chambers. Each of the fuel elements is provided with a stratum surrounding the chamber thereof, comprising a fissionable fuel-moderator material. Means are provided for activating or making critical the fissionable fuel material to melt the strata within the fuel elements. Each of the fuel elements has means for rotating the same to develop a centrifugal force to maintain the physical integrity of each of the strata when at least a portion thereof is in the molten phase. Means are provided for cooling the outer regions of the strata to maintain the same in the solid phase when the fissionable fuel material is made critical, and additional means is provided for injecting a working fluid through the solid and liquid regions of the strata into the thrust chambers. The working fluid is heated by the fission energy of the fuel material as it traverses the solid and liquid regions of the fuel material, and is exhausted axially through the thrust chambers.

Preferably, the fuel elements include a metallic casing consisting of a material capable of withstanding cryogenic temperatures and maintaining the structural integrity of the element, and a stratum of fissionable fuel material disposed on the inner wall thereof surrounding the thrust chamber, heavily diluted with a high temperature neutron moderator material. The metallic casing further is provided with a plurality of openings for injecting the propellant gas through the stratum of fuel element-moderator material. The fuel elements are individually rotated at high speeds to contain the liquid regions of the strata, and equal numbers thereof may be rotated in opposite directions to produce a zero net angular momentum of the entire device and the exhaust gases. The plurality of fuel elements is incorporated in a casing constructed of a suitable neutron reflector material having a conventional nozzle located at the exhaust ends of the fuel elements. The interstitial spaces between fuel elements and the casing are filled with a matrix of low temperature neutron moderator material. The entire unit is regeneratively cooled by the working fluid or propellant gas before it is injected into the fuel elements. The propellant gas preferably is a gas which does not react chemically with the fuel-moderator mixture, having a low molecular weight. This gas is circulated in the unit to cool the nozzle, the casing, and the matrix of low temperature neutron moderator material. The casing for the fuel elements is unpressurized while the thrust chambers of the fuel elements are individually pressurized.

Referring to the drawings, there is illustrated an embodiment of the invention. Generally, the embodiment includes a casing 10 having a cylindrical wall section 11, a closed end well 12 and a nozzle section 13, and a plurality of fuel elements 14 incorporated within the cylindrical wall section of the casing. The casing 10 may be constructed of any suitable neutron reflector material such as beryllium. The fuel elements 14 consist of elongated cylindrical elements having their axes disposed substantially mutually parallel and parallel to the axis of the cylindrical wall section 11 of the casing. Disposed in the interstitial spaces between the fuel elements and the casing is a matrix 15 consisting of a neutron moderator material which supports the fuel elements within the cylindrical wall section 11 of the casing. Suitable seals 16 are provided to seal the chamber enclosed by the cylindrical wall section of the casing from the nozzle section 13.

As best illustrated in FIGURE 3 of the drawing, each fuel cylinder has a metallic shell or casing member 17, including an elongated cylindrical section 18, a closed front end wall 19 and an annular rear end wall 20, providing an axially disposed opening 21. The metallic shell member can be constructed of any suitable metallic material capable of withstanding cryogenic temperatures and maintaining the structural integrity of the fuel element. It is preferred that the shell member be constructed of aluminum. The rear end of the shell member 17 is supported by a bearing 22, which is mounted in the matrix 15. The front end of the fuel element is provided with a hollow axial shaft 23, which communicates with the interior of the metallic shell 17, and is journaled in a bearing 24 mounted in the end wall 12 of the casing. The fuel element is rotated by means of an electrical motor 25, consisting of a conventional rotor 26 mounted on the shaft 23 and a stator 27 disposed in electromagnetic coupling relation with the rotor.

Disposed within the metallic shell member 17 is a metallic shroud member 28, including a cylindrical wall section 29 spaced from and disposed concentrically relative to the cylindrical wall section 18 of the shell member 17 to provide an annular manifold region 30 therebetween, a front end wall 31 being spaced axially from the front end wall 19 of the shell member 17, and an annular rear end wall 32 which is spaced axially from the rear end wall 20 of the shell member 17. It will be noted that the inner end of the annular end wall section 20 is turned axially inwardly and engages the inner end of the annular end wall 32, as at 33, to seal the space between the shell member 17 and the shroud member 28 from the axial interior of the fuel element. The shroud member 28 also is constructed of a material capable of withstanding cryogenic temperatures and maintaining the structural integrity of the fuel cell. The shroud member is maintained in spaced relation with the shell member 17 by means of a plurality of spacer elements 34. Also, the cylindrical wall section of the shroud member is provided with a plurality of radially extending openings 35 intercommunicating the manifold region 30 and the interior of the shroud member. Disposed within the shroud member between the end walls 31 and 32 thereof, is an annular stratum 36, consisting of a mixture of a fissionable fuel material heavily diluted with a neutron moderator material. Preferably, the fissionable fuel material is uranium carbide or dicarbide, and the neutron moderator material is a high temperature moderator material such as zirconium carbide or niobium carbide. Initially, the stratum 36 is provided with a plurality of radial passageways interconnecting the radial openings 35 in the cylindrical wall member 29 of the shroud member and the axial thrust chamber 37.

The matrix 15 of neutron moderator material preferably consists of an efficient low temperature moderator material, such as zirconium hydride or lithium hydride. As previously mentioned, the matrix fills the interstitial spaces between the elements and supports the seals 16 and the bearings 22 which normally carry no thrust load and only a small radial load. The matrix is provided with passageways 38 for circulating the propellant gas within the entire unit, to regeneratively cool the casing 10, including the nozzle section, and the fuel elements 14. The working fluid or propellant gas preferably is a gas having a low molecular weight such as hydrogen, which is supplied from a suitable liquefied source.

In normal operation, the incoming propellant gas is first circulated in the passageways 38 to regeneratively cool the casing 10, including the nozzle section 13, and the matrix 15. The propellant gas then is introduced through the hollow shaft 23 and the passageway formed between the front end walls 19 and 31, to the manifold region 30. Some of the propellant gas is bled through suitable openings 39 in the rear annular end wall 20, to cool various components of the unit. The propellant gas, preferably hydrogen, enters the manifold region 30 at perhaps 200°–300° R. It then is injected through the radial passageways 35 in the shroud member 28 and traverses radially inwardly through the stratum 36 of fissionable fuel element and moderator material to the thrust chamber 37, where it is exhausted axially through the opening 21 to the nozzle section 13. After the propellant flow has started through the fuel elements, the fuel elements are rotated and brought up to operating speed. When the reactor is started up after propellant flow has been initiated, the inner surface of the stratum 36 begins to melt and the solid-liquid interface 40 moves radially outwardly to produce a liquid region 41, and a solid region 42 until equilibrium between phases is established. As the propellant gas issues from the openings 35 in the shroud member, it first traverses the solid region of the stratum and is heated by the fission energy generated within the solid region. The gas is heated to a temperature of approximately 6,200° R. when it reaches the solid-liquid interface 40, and then continues to be heated as it bubbles radially inwardly through the liquid region 36 of the stratum until it reaches the thrust chamber 37. The temperature of the gas as it leaves the molten region 36 is approximately 8,600° R. The heated gas then is accelerated axially along the thrust chamber 37 and exhausted through the opening 21 to the nozzle 13, producing thrust.

It will be seen that the liquid region of the stratum 36 acts as a "topping" for the addition of heat to the propellant gas after it has received most of its energy in the solid region. The exact location of the solid-liquid interface is of no great consequence, since the cold incoming propellant gas will maintain it sufficiently at a distance from the cylindrical wall section 29 of the shroud member to maintain the structural integrity of the element.

The fissionable material in the fuel elements is made critical by conventional control drums mounted in the reflector casing. The reaction can be controlled in the conventional manner by rotating the control drums. An additional method of maintaining criticality is the disposition of a neutron "poison" (a neutron absorbing material), e.g. boron carbide distributed uniformly within the fuel-moderator mixture. This poison will evaporate at exactly the same rate as the fuel, thus maintaining the reactor multiplicaiton factor within the control range of the reflector mounted control drums. The reactor is deactivated by rotating the control drums until the fissionable fuel material in the strata 36 becomes subcritical. The propellant flow rate, however, is maintained until the molten regions of the strata 36 solidify around the passagessways of flowing propellant gas. These passageways probably will not resemble the original passageways in the strata, although they would provide adequate flow area for re-starting, since any "hot spots" will only cause localized melting on start-up and thus not affect either the structural integrity or operation of the reactor. After the strata 36 have solidified, the flow of the propellant gas is turned off.

Because each rotating fuel element is a cool self-contained pressurized unit, conventional mechanical drive systems can be employed in the unit. The fuel elements are driven at approximately 7,000 r.p.m. In the described embodiment, the fuel elements are driven by separate electric motors. It is possible, however, that a single turbine, driving geared components can be used.

The multiple element, liquid core nuclear propulsion reactor, as described, provides significantly superior performance in comparison to conventional large single element liquid core reactors. The principal quantitative performance advantages over conventional liquid core reactors are the reduction in the critical mass of uranium 235 from the order of about 1,000 kilograms in conventional reactors to about 5 kilograms, and an increase in the thrust/weight ratio from the order of about $10^{-2}$ in conventional reactors to the order of unity. The liquid core nuclear propulsion unit as described thus parallels closely the characteristics of conventional solid core systems, but with up to 100% higher specific impulses. Further advantages of the multiple element configuration are the elimination of essentially all high temperature structural problems and the restriction of high pressure regions to the small diameter fuel elements and the nozzle plenum. More specifically, the present invention has been found to have the following signifiacnt advantages:

(a) The nucleonic efficiency is considerably improved since the singel liquid core reactor configuration is replaced by what essentially may be treated as a homogeneous cylinder.

(b) The flow area which is the limiting factor on total propellant flow rate and hence thrust, is considerably increased.

(c) The cool interstices between the cylindrical fuel elements can be partially or wholly filled with a good neutron moderator at low temperature, thereby providing a highly efficient thermal neutron spectrum and resulting in a critical mass at least several orders of magnitude smaller than that of conventional single liquid core reactor configurations.

(d) Thermalization of the core permits dilution of the fissionable fuel material by a low vapor pressure moderator, thereby greatly mitigating the performance degradation due to fuel element vaporization.

(e) The entire structure of the multiple element reactor is cooled, since the outer portions of each fuel element aer exposed to the incoming cold propellant gas. The high temperature region is restricted to the central core of each fuel element which has no structural function.

(f) Rotation of the small cylinders necessary for retention of the molten fuel by centrifugal techniques can be readily achieved in the cool structure by conventional engineering methods.

(g) The cool, small element configuration provides the capability of very high propellant pressures, thus further improving the thrust/weight ratio. The extension of higher thrust chamber pressures is not accompanied by reduced specific impulses, because only a relatively small compensatory increase in propellant stagnation temperature is adequate to offset the exhaust molecular weight increase resulting from the reduced propellant dissociation due to the higher pressure.

(h) The reduced structural loads with respect to the small fuel elements permits the use of a uniform fuel mixture.

(i) The use of multiple fuel elements permits rotation of substantially equal numbers of elements in opposite directions, resulting in substantially a zero net annular momentum of both the structure and the exhaust gas.

(j) It provides the possibility for continuous replenishment of fissionable material during operation of the reactor.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What we claim is:

1. A nuclear reactor propulsion unit comprising a plurality of rotatable fuel elements, the interiors of said fuel elements defining thrust chambers, each of said fuel elements having a stratum surrounding the chamber thereof comprising a fissionable fuel-moderator material, means for activating said fissionable fuel material to melt said strata, means for individually rotating said fuel elements to maintain the physical integrity of each of said strata when at least a portion thereof is in the molten phase, means for cooling the outer regions of said strata to maintain the same in the solid phase when said fissionable fuel material is activated and means for injecting a working fluid through said strata into said thrust chambers.

2. A nuclear reactor propulsion unit comprising a plurality of rotatable fuel elements, the interiors of said fuel elements defining thrust chambers, each of said fuel elements having a stratum surrounding the chamber therein comprising a mixture of fissionable fuel material and a high temperature moderator material, means for activating said fissionable fuel material to melt said strata, means for individually rotating said fuel elements to maintain the physical integrity of each of said strata when at least a portion thereof is in the molten phase, means for cooling the outer regions of said strata to maintain the same in the solid phase when said fissionable material is activated and means for injecting a working fluid through said strata into said thrust chambers.

3. A nuclear reactor propulsion unit comprising a plurality of rotatable fuel elements, the interiors of said fuel elements defining thrust chambers, said thrust chambers being individually pressurized, each of said fuel elements having a stratum surrounding the chamber thereof comprising a fissionable fuel-moderator material, means for activating said fissionable fuel material to melt said strata, means for individually rotating said fuel elements to maintain the physical integrity of each of said strata when at least a portion thereof is in the molten phase, means for cooling the outer regions of said strata to maintain the same in the solid phase when said fissionable fuel material is activated and means for injecting a working fluid through said strata into said thrust chambers.

4. A nuclear reactor propulsion unit comprising a plurality of rotatable fuel elements, said fuel elements being disposed in a matrix comprising a neutron moderator material, the interiors of said fuel elements defining thrust chambers, each of said fuel elements having a stratum surrounding the chamber thereof comprising a fissionable fuel-moderator material, means for activating said fissionable fuel material to melt said strata, means for individually rotating said fuel elements to maintain the physical integrity of each of said strata when at least a portion thereof is in the molten phase, means for cooling the outer regions of said strata to maintain the same in the solid phase when said fissionable fuel material is activated and means for injecting a working fluid through said strata into said thrust chambers.

5. A nuclear reactor propulsion unit comprising a plurality of rotatable fuel elements, said fuel elements being disposed in a cool matrix comprising an efficient low temperature neutron moderator material, the interiors of said fuel elements defining thrust chambers, each of said fuel elements having a stratum surrounding the chamber thereof comprising a fissionable fuel-moderator material, means for activating said fissionable fuel material to melt said strata, means for individually rotating said fuel elements to maintain the physical integrity of each of said strata when at least a portion thereof is in the molten phase, means for cooling the outer regions of said strata to maintain the same in the solid phase when said fissionable fuel material is activated and means for injecting a working fluid through said strata into said thrust chambers.

6. A nuclear reactor propulsion unit comprising a plurality of rotatable fuel elements, said fuel elements being disposed in a matrix comprising a neutron moderator material, the interiors of said fuel elements defining thrust chambers, said thrust chambers being individually pressurized, each of said fuel elements having a stratum surrounding the chamber thereof comprising a fissionable fuel-moderator material, means for activating said fissionable fuel material to melt said strata, means for individually rotating said fuel elements to maintain the physical integrity of each of said strata when at least a portion thereof is in the molten phase, means for cooling the outer regions of said strata to maintain the same in the solid phase when said fissionable fuel material is activated and means for injecting a working fluid through said strata into said thrust chambers.

7. A nuclear reactor propulsion unit comprising a plurality of rotatable fuel elements, said fuel elements being disposed in a matrix comprising a low temperature neutron moderator material, the interiors of said fuel elements defining thrust chambers, each of said fuel elements having a stratum surrounding the chamber thereof comprising a mixture of fissionable fuel material and a high temperature moderator material, means for activating said fissionable fuel material to melt said strata, means for individually rotating said fuel elements to maintain the physical integrity of each of said strata when at least a portion thereof is in the molten phase, means for cooling the outer regions of said strata to maintain the same in the solid phase when said material is activated and means for injecting a working fluid through said strata into said thrust chambers.

8. A nuclear reactor propulsion unit comprising a plurality of rotatable fuel elements, said fuel elements being disposed in a matrix comprising a neutron moderator material, the interiors of said fuel elements defining thrust chambers, each of said fuel elements having a stratum surrounding the chamber thereof comprising a fissionable fuel moderator material, means for activating said fissionable fuel material to melt said strata, means for individually rotating said fuel elements to maintain the physical integrity of each of said strata when at least a portion thereof is in the molten phase, means for injecting a working fluid through said strata into said thrust chambers and means for circulating said working fluid through said matrix for cooling the outer regions of said strata to maintain the same in the solid phase when said fissionable fuel material is activated.

9. A nuclear reactor propulsion unit comprising a plurality of rotatable fuel elements, the interiors of said fuel elements defining thrust chambers, each of said fuel elements having a stratum surrounding the chamber thereof comprising a fissionable fuel-moderator material, means for activating said fissionable fuel material to melt said strata, means for individually rotating equal numbers of said fuel elements in opposite directions to maintain the physical integrity of each of said strata when at least a portion thereof is in the molten phase and to provide a zero net angular momentum of both the unit and the exhaust gases thereof, means for cooling the outer regions of said strata to maintain the same in the solid phase when said fissionable fuel material is activated and means for injecting a working fluid through said strata into said thrust chambers.

10. A nuclear reactor propulsion unit comprising a plurality of rotatable fuel elements, said fuel elements being disposed in a matrix comprising a neutron moderator material, the interiors of said fuel elements defining thrust chambers, each of said fuel elements having a stratum surrounding the chamber thereof comprising a fissionable fuel moderator material, means for activating said fissionable fuel material to melt said strata, means for individually rotating equal numbers of said fuel elements in opposite directions to maintain the physical integrity of each of said strata when at least a portion thereof is in the molten phase and to provide a zero net angular momentum of both the unit and the exhaust gases thereof, means for cooling the outer regions of said strata to maintain the same in the solid phase when said fissionable fuel material is activated and means for injecting a working fluid through said strata into said thrust chambers.

11. A nuclear reactor propulsion unit comprising a casting of a neutron reflector material having a nozzle opening, a plurality of rotatable cylindrical fuel elements disposed in said casing, the axes of said fuel elements being substantially parallel, the interiors of said fuel elements defining thrust chambers having discharge openings communicating with the nozzle opening of said casing, each of said fuel elements having a rigid metallic shell and a stratum therein surrounding the chamber thereof comprising a fissionable fuel-moderator material, means for activating said fissionable fuel material to melt said strata, means for individually rotating said fuel elements to maintain the physical integrity of each of said strata when at least a portion thereof is in the molten phase, means for cooling the outer regions of said strata to maintain the same in the solid phase when said fissionable fuel material is activated and means for injecting a working fluid through said strata into said thrust chambers.

12. A nuclear reactor propulsion unit comprising a casing of a neutron reflector material having a nozzle opening, a plurality of rotatable cylindrical fuel elements disposed in said casing, the axes of said fuel elements being substantially parallel, the interior of said fuel elements defining thrust chambers having discharge openings communicating with the nozzle opening of said casing, each of said fuel elements having a rigid metallic shell and a stratum therein surrounding the chamber thereof comprising a mixture of fissionable fuel material and a high temperature moderator material, means for activating said fissionable fuel material to melt said strata, means for individually rotating said fuel elements to maintain the physical integrity of each of said strata when at least a portion thereof is in the molten phase, means for cooling the outer regions of said strata to maintain the same in the solid phase when said fissionable fuel material is activated and means for injecting a working fluid through said strata into said thrust chambers.

13. A nuclear reactor propulsion unit comprising a casing of a neutron reflector material having a nozzle opening, a plurality of rotatable cylindrical fuel elements disposed in said casing, the axes of said fuel elements being substantially parallel, the interiors of said fuel elements defining thrust chambers having discharge openings communicating with the nozzle opening of said casing, said thrust chambers being individually pressurized, each of said fuel elements having a rigid metallic shell and a stratum therein surrounding the chamber thereof comprising a fissionable fuel-moderator material, means for activating said fissionable fuel material to melt said strata, means for individually rotating said fuel elements to maintain the physical integrity of each of said strata when at least a portion thereof is in the molten phase, means for cooling the outer region of said strata to maintain the same in the solid phase when said fissionable fuel material is activated and means for injecting a working fluid through said strata into said thrust chambers.

14. A nuclear reactor propulsion unit comprising a casing of a neutron reflector material having a nozzle opening, a plurality of rotatable cylindrical fuel elements disposed in said casing, a matrix comprising a neutron moderator material disposed in the interstitial spaces between the fuel elements and said casing, the interiors of said fuel elements defining thrust chambers, each of said fuel elements having a stratum surrounding the chamber thereof comprising fissionable fuel-moderator material, means for activating said fissionable fuel material to melt said strata, means for individually rotating said fuel elements about their axes to maintain the physical integrity of each of said strata when at least a portion thereof is in the molten phase, means for cooling the outer regions of said strata to maintain the same in the solid phase when said fissionable fuel material is activated and means for injecting a working fluid through said strata into said thrust chambers.

15. A nuclear reactor propulsion unit comprising a casing of a neutron reflector material having a nozzle opening, a plurality of rotatable cylindrical fuel elements disposed in said casing, a matrix comprising a low temperature neutron moderator material disposed in the interstitial spaces between the fuel elements and said casing, the interiors of said fuel elements defining thrust chambers, each of said fuel elements having a stratum surrounding the chamber thereof comprising fissionable fuel-moderator material, means for activating said fissionable material to melt said strata, means for individually rotating said fuel elements about their axes to maintain the physical integrity of each of said strata when at least a portion thereof is in the molten phase, means for cooling the outer regions of said strata to maintain the same in the solid phase when said fissionable fuel material is activated and means for injecting a working fluid through said strata into said thrust chambers.

16. A nuclear reactor propulsion unit comprising a casing of a neutron reflector material having a nozzle opening, a plurality of rotatable cylindrical fuel elements disposed in said casing, a matrix comprising a neutron moderator material disposed in the interstitial spaces between the fuel elements and said casing, the interiors of said fuel elements defining thrust chambers, said thrust chambers being individually pressurized, each of said fuel elements having a stratum surrounding the chamber thereof comprising fissionable fuel-moderator material, means for activating said fissionable fuel material to melt said strata, means for individually rotating said fuel elements about their axes to maintain the physical integrity of each of said strata when at least a portion thereof is in the molten phase, means for cooling the outer regions of said strata to maintain the same in the solid phase when said fissionable fuel material is activated and means for injecting a working fluid through said strata into said thrust chambers.

17. A nuclear reactor propulsion unit comprising a casing of a neutron reflector material having a nozzle opening, a plurality of rotatable cylindrical fuel elements disposed in said casing, the axes of said fuel elements being substantially parallel, a matrix of low temperature neutron moderator material being disposed in the interstitial spaces between said fuel elements and said casing, the interiors of said fuel elements defining thrust chambers having discharge openings communicating with the nozzle opening of said casing, each of said fuel elements having a rigid metallic shell capable of withstanding cryogenic temperatures and a stratum therein surrounding the chamber thereof comprising a mixture of a fissionable fuel material and a high temperature moderator material, means for activating said fissionable fuel material to melt said strata, means for individually rotating said fuel elements about their axes to maintain the physical integrity of each of said strata when at least a portion thereof is in the molten phase, means for cooling the outer regions of said strata to maintain the same in the solid phase when said fissionable fuel material is activated and means for injecting working fluid through said strata into said thrust chambers.

18. A nuclear reactor propulsion unit comprising a casing of a neutron reflector material having a nozzle opening, a plurality of rotatable cylindrical fuel elements disposed in said casing, a matrix comprising a neutron moderator material disposed in the interstitial spaces between the fuel elements and said casing, the interiors of said fuel elements defining thrust chambers, each of said fuel elements having a stratum surrounding the chamber thereof comprising a fissionable fuel-moderator material, means for activating said fissionable fuel material to melt said strata, means for individually rotating said fuel elements about their axes to maintain the physical integrity of each of said strata when at least a portion thereof is in the molten phase, means for injecting a working fluid through said strata into said thrust chambers and means for circulating said working fluid through said matrix prior to said injection for cooling the outer regions of said strata to maintain the same in the solid phase when said fissionable fuel material is activated.

19. A nuclear reactor propulsion unit comprising a casing having a nozzle opening, a plurality of rotatable cylindrical fuel elements disposed in said casing, the axes of said fuel elements being substantially parallel, the interiors of said fuel elements defining thrust chambers having discharge openings communicating with the nozzle opening of said casing, each of said fuel elements having a rigid metallic shell and a stratum surrounding the chamber thereof comprising a fissionable fuel-moderator material, means for activating said fissionable fuel material to melt said strata, means for individually rotating equal numbers of said fuel elements in opposite directions about their axes to maintain the physical integrity of each of said strata when at least a portion thereof is in the molten phase and to provide a zero net angular momentum of both the unit and the exhaust gases of said fuel elements, means for cooling the outer regions of said strata to maintain the same in the solid phase when said fissionable fuel material is activated and means for injecting a working fluid through said strata into said thrust chambers.

20. A nuclear reactor propulsion unit comprising a casing of a neutron reflector material having a nozzle opening, a plurality of rotatable cylindrical fuel elements disposed in said casing, a matrix comprising a neutron moderator material disposed in the interstitial spaces between the fuel elements and said casing, the interiors of said fuel elements defining thrust chambers, each of said fuel elements having a stratum surrounding the chamber thereof comprising fissionable fuel-moderator material, means for activating said fissionable fuel material to melt said strata, means for individually rotating equal numbers of said fuel elements in opposite directions about their axes to maintain the physical integrity of each of said strata when at least a portion thereof is in the molten phase and to provide a zero net angular momentum of both the unit and the exhaust gases of said fuel elements, means for cooling the outer regions of said strata to maintain the same in the solid phase when said fissionable fuel material is activated and means for injecting a working fluid through said strata into said thrust chambers.

21. A nuclear reactor propulsion unit comprising a plurality of rotatable fuel elements, the interiors of said fuel elements defining thrust chambers, each of said fuel elements having a stratum surrounding the chamber thereof comprising a mixture of fissionable uranium carbide and zirconium carbide, means for activating the fissionable uranium carbide to melt said strata, means for individually rotating said fuel elements to maintain the physical integrity of each of said strata when at least a portion thereof is in the molten phase, means for cooling the outer regions of said strata to maintain the same in the solid phase when said fissionable uranium carbide is activated and means for injecting an inert working fluid having a low molecular weight through said strata into said thrust chamber.

22. A nuclear reactor propulsion unit according to claim 21, in which each fuel chamber is individually pressurized.

23. A nuclear reactor propulsion unit comprising a plurality of rotatable fuel elements, said fuel elements being disposed in a matrix comprising metallic hydride, the interiors of said fuel elements defining thrust chambers, each of said fuel elements having a stratum surrounding the chamber thereof comprising a fissionable fuel-moderator material, means for activating said fissionable fuel material to melt said strata, means for individually rotating said fuel elements to maintain the physical integrity of each of said strata when at least a portion thereof is in the molten phase, means for cooling the outer regions of said strata to maintain the same in the solid phase when said fissionable fuel material is activated and means for injecting an inert working fluid having a low molecular weight through said strata into said thrust chambers.

24. A nuclear reactor propulsion unit according to claim 23, in which the metallic hydride is zirconium hydride.

25. A nuclear reactor propulsion unit according to claim 23, wherein the metallic hydride is lithium hydride.

26. A nuclear reactor propulsion unit according to claim 23, wherein the fissionable fuel-moderator material comprises a mixture of fissionable uranium carbide and zirconium carbide.

27. A nuclear reactor propulsion unit according to claim 24, wherein the fissionable fuel-moderator material comprises a mixture of fissionable uranium carbide and zirconium carbide.

28. A nuclear reactor propulsion unit according to claim 25, in which the fissionable fuel-moderator material comprises a mixture of fissionable uranium carbide and zirconium carbide.

29. A nuclear reactor propulsion unit comprising a casing formed of berryllium having a nozzle opening, a plurality of rotatable cylindrical fuel elements disposed in said casing, the axes of said fuel elements being substantially parallel, said fuel elements being disposed in a matrix of zirconium hydride, the interiors of said fuel elements defining thrust chambers having discharge openings communicating with the nozzle opening of said casing, each of said fuel elements having an aluminum shell and a stratum therein surrounding the chamber thereof consisting of a mixture of fissionable uranium carbide and zirconium carbide, means for activating said fissionable uranium carbide, means for individually rotating said fuel elements about their axes to maintain the physical integrity of each of said strata when at least a portion thereof is in the molten phase, means for injecting a working fluid having a low molecular weight through said strata into said thrust chambers and means for circulating said working fluid through said matrix for cooling the outer regions of said strata to maintain the same in the solid phase when said uranium carbide is activated.

30. A nuclear reactor propulsion unit according to claim 29, in which a stratum of zirconium hydride is interposed between the aluminum shell and the stratum comprising a mixture of fissionable uranium carbide and zirconium carbide, in each fuel element.

References Cited

Astronautics, October 1959, p. 48.
Astronautics and Aerospace Engineering, November 1963, pp. 105 and 106.
Jet Propulsion, January-February 1954, pp. 36–37.
Nuclear Rocket Propulsion, Bussard et al., McGraw-Hill Book Co., Inc., 1958, pp. 244–247 and 272.
Astronautics, October 1959, p. 22.
Science, May 17, 1963, pp. 781–789.
R. W. Bussard and R. D. DeLaney, Fundamentals of Nuclear Flight. 1965.
Journal of Spacecraft and Rockets, vol. 2, No. 3, pp. 384–391, May-June 1965.

REUBEN EPSTEIN, *Primary Examiner.*

U.S. Cl. X.R.

176—39, 41, 60